(12) United States Patent
Sihler et al.

(10) Patent No.: US 8,020,455 B2
(45) Date of Patent: Sep. 20, 2011

(54) MAGNETOSTRICTIVE SENSING SYSTEMS AND METHODS FOR ENCODING

(75) Inventors: Christof Martin Sihler, Bavaria (DE); Jan Erich Hemmelmann, Bavaria (DE); Simon Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/363,178

(22) Filed: Jan. 30, 2009

(65) Prior Publication Data

US 2009/0301224 A1 Dec. 10, 2009

Related U.S. Application Data

(63) Continuation-in-part of application No. 12/134,689, filed on Jun. 6, 2008, now Pat. No. 7,631,564.

(51) Int. Cl.
*G01L 3/04* (2006.01)
(52) U.S. Cl. .............................. 73/862.333; 73/862.331
(58) Field of Classification Search ............. 73/862.331, 73/862.333; 324/207.2, 207.25
See application file for complete search history.

(56) References Cited

U.S. PATENT DOCUMENTS

| | | | | |
|---|---|---|---|---|
| 4,762,008 A | * | 8/1988 | Kobayashi et al. | 73/862.336 |
| 5,703,298 A | * | 12/1997 | Odachi et al. | 73/862.333 |
| 5,831,180 A | * | 11/1998 | Tanaka et al. | 73/862.333 |
| 6,346,812 B1 | | 2/2002 | May et al. | |
| 6,490,934 B2 | * | 12/2002 | Garshelis | 73/862.336 |
| 6,581,480 B1 | * | 6/2003 | May et al. | 73/862.333 |
| 6,776,057 B1 | | 8/2004 | May | |
| 6,779,409 B1 | | 8/2004 | Kwun et al. | |
| 6,810,754 B2 | | 11/2004 | May | |
| 6,826,969 B1 | | 12/2004 | May | |
| 6,904,814 B2 | | 6/2005 | May | |
| 6,940,186 B2 | | 9/2005 | Weitkamp | |
| 6,959,612 B2 | | 11/2005 | May | |
| 6,975,196 B1 | | 12/2005 | Laidlaw | |
| 7,004,724 B2 | | 2/2006 | Pierce et al. | |

(Continued)

FOREIGN PATENT DOCUMENTS

DE 300922 9/1981

(Continued)

OTHER PUBLICATIONS

NCTE Engineering GmbH, "Torque Sensor Design & Dimension," http://www.ncte.de/ncte/cms/upload/downloads/english/D &D%20Torque.pdf, May 2006, pp. 1-8.

(Continued)

*Primary Examiner* — Freddie Kirkland, III
(74) *Attorney, Agent, or Firm* — Scott J. Asmus

(57) ABSTRACT

A magnetostrictive measurement system having one or more encoded polarized magnetic regions disposed circumferentially about a shaft, wherein adjacent magnetic regions along a section of the shaft have opposing polarities. In one embodiment the shaft is hollow and the encodings are interiorly disposed while in another embodiment the encodings are on the exterior surface of the shaft. There are one or more sensors, such as contact sensors, disposed about the shaft wherein the sensors enable measurements of at least one of bending moments or torque sensing. The sensors can also include non-contact sensors measuring the magnetic flux densities caused by the alternating magnetic fields from the rotating shaft. A processing section is used to process the sensor measurements, wherein the sensor measurements are used to compute at least one of shaft power, torque, speed, and bending moments.

19 Claims, 8 Drawing Sheets

U.S. PATENT DOCUMENTS

| | | | |
|---|---|---|---|
| 7,024,946 B2 * | 4/2006 | Nehl et al. | 73/862.333 |
| 7,095,129 B2 | 8/2006 | Moroz | |
| 7,117,752 B2 | 10/2006 | May | |
| 7,118,339 B2 | 10/2006 | Moroz et al. | |
| 7,124,649 B2 | 10/2006 | May | |
| 7,160,083 B2 | 1/2007 | Pierce et al. | |
| 7,243,557 B2 * | 7/2007 | May | 73/862.331 |
| 7,363,827 B2 | 4/2008 | Hedayat et al. | |
| 7,395,724 B2 * | 7/2008 | Bunyer et al. | 73/862.339 |
| 7,469,604 B2 | 12/2008 | Hedayat et al. | |
| 7,631,564 B1 * | 12/2009 | Sihler et al. | 73/862.333 |
| 2006/0032319 A1 | 2/2006 | Zielinski | |
| 2007/0247224 A1 * | 10/2007 | May | 330/63 |
| 2008/0204001 A1 * | 8/2008 | May | 324/207.2 |
| 2008/0257070 A1 * | 10/2008 | May | 73/862.333 |
| 2008/0313886 A1 | 12/2008 | May | |
| 2008/0315870 A1 | 12/2008 | May | |
| 2008/0316669 A1 | 12/2008 | May | |
| 2009/0007697 A1 | 1/2009 | May | |
| 2009/0021244 A1 * | 1/2009 | May | 324/207.2 |
| 2009/0219122 A1 * | 9/2009 | May | 335/284 |

FOREIGN PATENT DOCUMENTS

| | | |
|---|---|---|
| DE | 19847982 | 6/1999 |
| EP | 1674724 | 6/2006 |
| EP | 1744136 | 1/2007 |
| WO | WO2005064302 A2 | 7/2005 |
| WO | 2006013089 | 2/2006 |
| WO | 2007006553 | 1/2007 |
| WO | 2007006555 | 1/2007 |
| WO | 2007068496 | 6/2007 |
| WO | 2008087180 | 7/2008 |

OTHER PUBLICATIONS

I. Sasada et al., "Detection of Instantaneous Torque Using The Magnetostrictive Effect in a Practical Ferromagnetic Shaft," IEEE Transactions on Magnetics, vol. 24, No. 6, Nov. 1988, pp. 2886-2888.

Fraunhofer Institute "A Contactless Torque Sensor for Online Monitoring of Torsional Oscillations," 2007, pp. 1-4.

I. J. Garshelis, "A Torque Transducer Utilizing a Circularly Polarized Ring," IEEE Transactions on Magnetics, vol. 28, No. 5, Sep. 1992, pp. 2202-2204.

Magnetoelastic Devices, Inc., "The New Standard for Torque Sensing," MD001-8076, Booklet pp. 1-17, 1998.

F. T. Calkins et al., "Terfenol-D Vibration Control Of A rotating Shaft," Adaptive Structures and Composite Materials: Analysis and Application, ASME 1994, AD-vol. 45/MD-vol. 54, pp. 267-273.

NCTE Engineering GmbH, "Bending Sensor Design & Dimension," http://www.ncte, Aug. 2006, pp. 1-10.

DE19847982, Abstract Only. Jun. 10, 1996.

Intellectual Property Office—United Kingdom, Search Report, Sep. 24, 2009, 3 pages.

Translation of German Office Action dated Jun. 23, 2010.

* cited by examiner

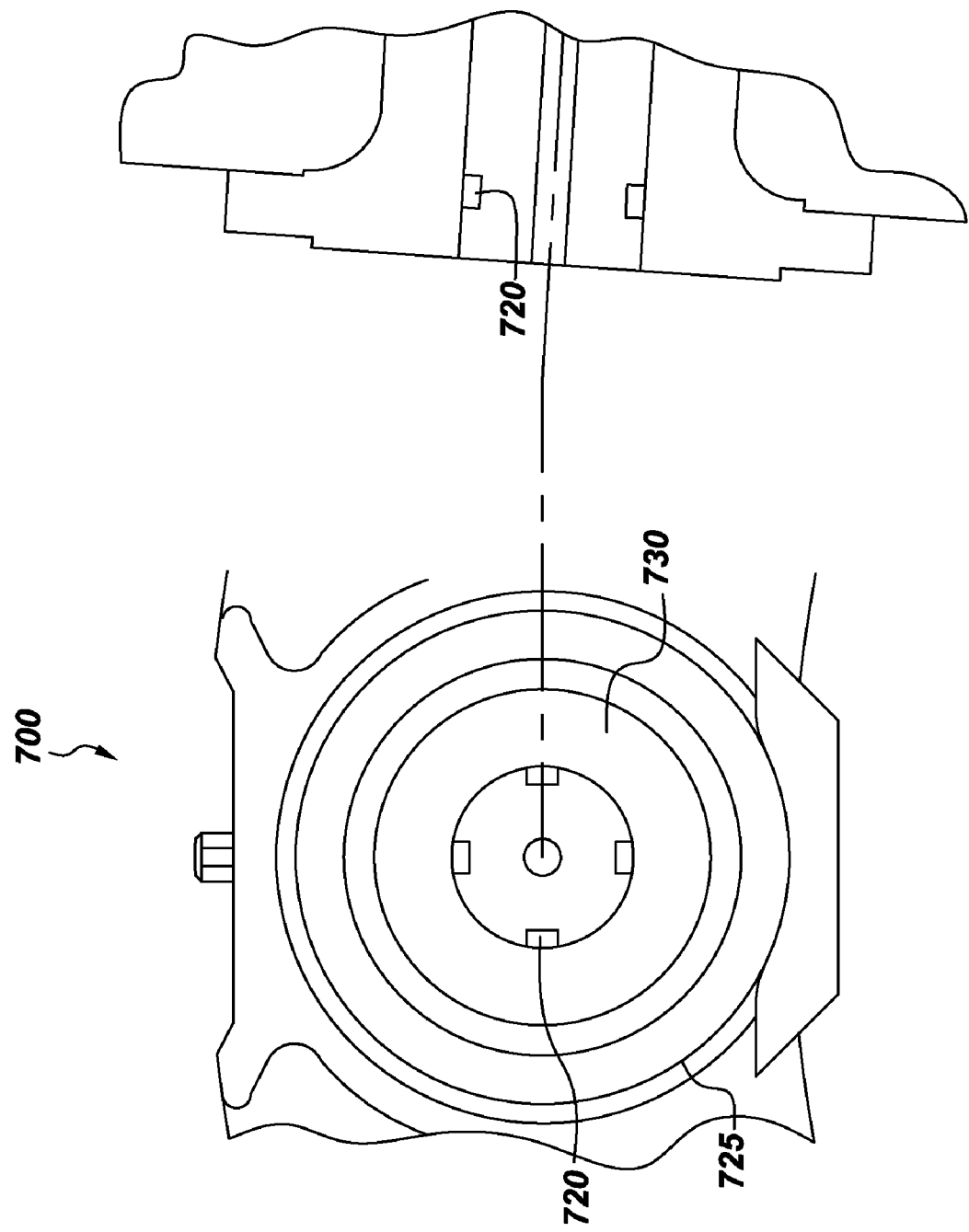

MAGNETOSTRICTIVE SENSING SYSTEMS AND METHODS FOR ENCODING

CROSS REFERENCE TO RELATED APPLICATION

This application is a Continuation-in-Part of U.S. application Ser. No. 12/134,689, filed Jun. 6, 2008, which is herein incorporated in its entirety by reference.

BACKGROUND OF THE INVENTION

Sustainable energy sources, for example wind turbines, are gaining widespread popularity due to the increased energy demands and the desire to reduce the consumption of natural resources such as oil and gas. Modern wind farms are being deployed around the world to increase their overall energy output.

The wind turbines generally have one or more blades, typically located atop high towers, wherein the blades are rotated by the wind flow. The blades are coupled to a large diameter rotating shaft or rotor that is typically coupled to a generator via a gearbox (transmission) or by direct coupling.

The control technology tends to be complex, as the wind speeds fluctuate in intensity and direction. Horizontal wind shears and yaw misalignment, together with natural turbulence, are causes of asymmetric loads on the wind turbine hub and consequently the main shaft. These asymmetric loads together with those from vertical wind shears contribute to extreme loads and the increased number of fatigue cycles accumulated by a wind turbine system. These extreme loads and fatigue cycles can lead to failure of the system operations, inefficiencies, and possibly damage to the wind turbine components. The control becomes even more complex as the size of the wind turbines and energy output demands per unit increase.

There are asymmetric load control systems developed to measure bending moments acting on the hub and main shaft, and these systems serve as the primary control input for advanced controls. Certain asymmetric load control systems have been developed to reduce the effects associated with asymmetric loads. In a general sense, the asymmetric load control system receives measurement signals, wherein at least one operational parameter of the wind power plant such as the blade pitch, revolutions and/or yaw angle is adjusted depending on the measurement.

One of the difficulties for control processing is the ability to obtain highly accurate measurements. Another factor relates to the mean time between failures and the ability to obtain such accurate measurements for a satisfactory length of time. Another factor relates to the cost associated with implementation of the asymmetric load systems, as the industry demands a cost-effective approach that can be integrated with existing manufacturing. Measurement inaccuracies are particularly difficult to detect in unmanned wind power plants and can adversely impact fatigue and lifetime of the blades, drive train and tower.

One approach is to measure asymmetric loads by taking displacement measures on fixed elements of the turbine, however this has not provided the desired results. Another approach is to measure asymmetric loads by placing sensors on the blades. For example, one system deploys strain gauges mounted on the rotor blades for sensing the load on the rotor blades. This asymmetrical load sensing solution requires mounting sensors in the outer regions of the rotor blades that are difficult to access and are jeopardized by lightning. In addition, these strain gauges do not typically attain the required lifetime stress cycles. Another known technique uses optical fibers, such as the Fiber Bragg Grating Technology, wherein the intrinsic Bragg sensor elements are distributed along an optical fiber that is attached to the rotor blades. While the system is insensitive to lightning, the optical fibers are subject to damage and subsequent malfunction.

A different approach is based on measuring the deflection of the shaft of the wind turbine caused by the asymmetric loads. The asymmetric loads cause bending moments in the rotor blades that are then transferred to the rotating low-speed shaft, such that the asymmetrical loads appear as a force or bending moment component in the main shaft of the turbine The measurement of the asymmetric loads can thus be based on shaft measurements since the shaft deflects with respect to its non-loaded condition.

Existing measurement solutions are typically based on proximity sensors. Such sensing solutions require an extremely stiff reference (heavy support structure) and are vulnerable to bracket deflection and sensor drift as sources of error. Since the main shaft system is stiff, small offset errors in the sensor measurement, such as 0.1 mm, correspond to high errors in the bending moment evaluation, such as 200 kNm. Operation with offset errors in the sensor measurement can lead to more extreme loads and fatigue than operation with no advanced controls. Furthermore, manual removal of offset errors is not typically desirable. By way of example, in wind turbine applications, manual removal of offset errors would require maintenance to all turbines. Automatic calibration features can be applied to solve such problems, but sensor movement or drift of certain types cannot be excluded in-between calibrations without detection/faults. It is also possible for bedplate deformation or bearing moment reaction to be non-zero with thrust load relative to the gravity-only calibration state such that false signal offsets appear when operating.

The reliability issues with the measurement input for the asymmetric load control systems have not been adequately resolved and the difficulty is increasing with nominal power of the turbine. Conventional systems for measuring components of mechanical forces, such as torque or bending moments, in shafts have been based on the magnetostrictive effect of the shaft material or a ferromagnetic strip attached to the shaft. For example, certain magnetostrictive sensing solutions have been developed and applied in the automotive industry and can identify components of the mechanical forces in rotating shafts. Methods of improving the sensor performance by magnetizing this strip or the shaft are also known. However, the large dimensions of shafts, such as the wind turbine shaft, are not typically amenable to conventional encodings used on smaller diameter shafts. Other encoding technologies that employ magnetized strips to the shaft tend to have problems with accuracy over a long term.

BRIEF SUMMARY

One embodiment of the present invention provides measurement methods and systems, and more particularly to the sensing of bending moments and/or torque of a rotating shaft.

One embodiment is a magnetostrictive measurement system, comprising a plurality of encoded regions circumferentially disposed about a shaft and one or more rotating sensors coupled to the shaft proximate at least some of the encoded regions, wherein the rotating sensors rotate with the shaft and enable measurements of magnetic field properties of the encoded regions. The magnetic field properties include bending moments in a horizontal and vertical direction.

The rotating sensors can be affixed to a surface of the shaft or held in a fixture that is affixed to a surface of the shaft. The system can further comprise one or more stationary sensors disposed proximate the encoded regions with a gap between the stationary sensors and the shaft. In one example, the shaft is hollow and at least some of the encoded regions are disposed on an interior surface of the shaft.

The encoded regions in one embodiment comprise first encoded regions and second encoded regions with one or more first encoded region sensors configured to measure shaft properties at the first encoded regions and one or more second encoded region sensors configured to measure shaft properties at the second encoded regions. The first encoded regions can be different than the second encoded regions.

One embodiment includes a processing section for processing the magnetic field properties and computing shaft properties. The magnetic field properties can be communicated to the processing section by one or more slip rings disposed about the shaft or via wireless communications.

A further embodiment is a magnetostrictive shaft, having at least two polarized encoded magnetic regions on an interior surface of a hollow shaft along a circumferential direction of the hollow shaft and one or more sensors disposed about the encoded magnetic regions, wherein at least one of the sensors measure magnetic field properties of the hollow shaft. The sensors can be at least one of non-contact sensors and rotating sensors. In one example, at least one of the encoded magnetic regions has two or more layers of encodings.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 7a illustrates another sensing implementation for the sensing system for a shaft in accordance with one embodiment.

FIG. 7b shows a perspective view of the sensing implementation of FIG. 7a in accordance with one embodiment.

DETAILED DESCRIPTION

One embodiment of the invention relates to applying a permanent magnetic encoding to a shaft, such as the main shaft of a wind turbine, to enable accurate and long term stable monitoring of torque and/or bending moments that can be used for various purposes such as asymmetrical load control and other advanced control and condition monitoring tasks such as indicating gearbox condition. A further embodiment enables more reliable sensing for the current generation of wind turbines and the future generation of higher power wind turbines.

The magnetic encoding and system embodiments herein may be related to certain concepts and techniques of the sectional magnetic encoding as described in the related U.S. application Ser. No. 12/134,689, filed Jun. 6, 2008, hereby incorporated by reference.

In one aspect, the sectional encoding turns a shaft into a component of the measurement system and rotating sensors are disposed on the shaft and detect shaft properties such as bending moments and torque. A further aspect adds stationary or non-contact sensors about the shaft, wherein the rotating shaft results in changing magnetic field that generate AC field components. The resulting AC field components are then measurable by the sensors in proximity to the shaft.

Figure 1:
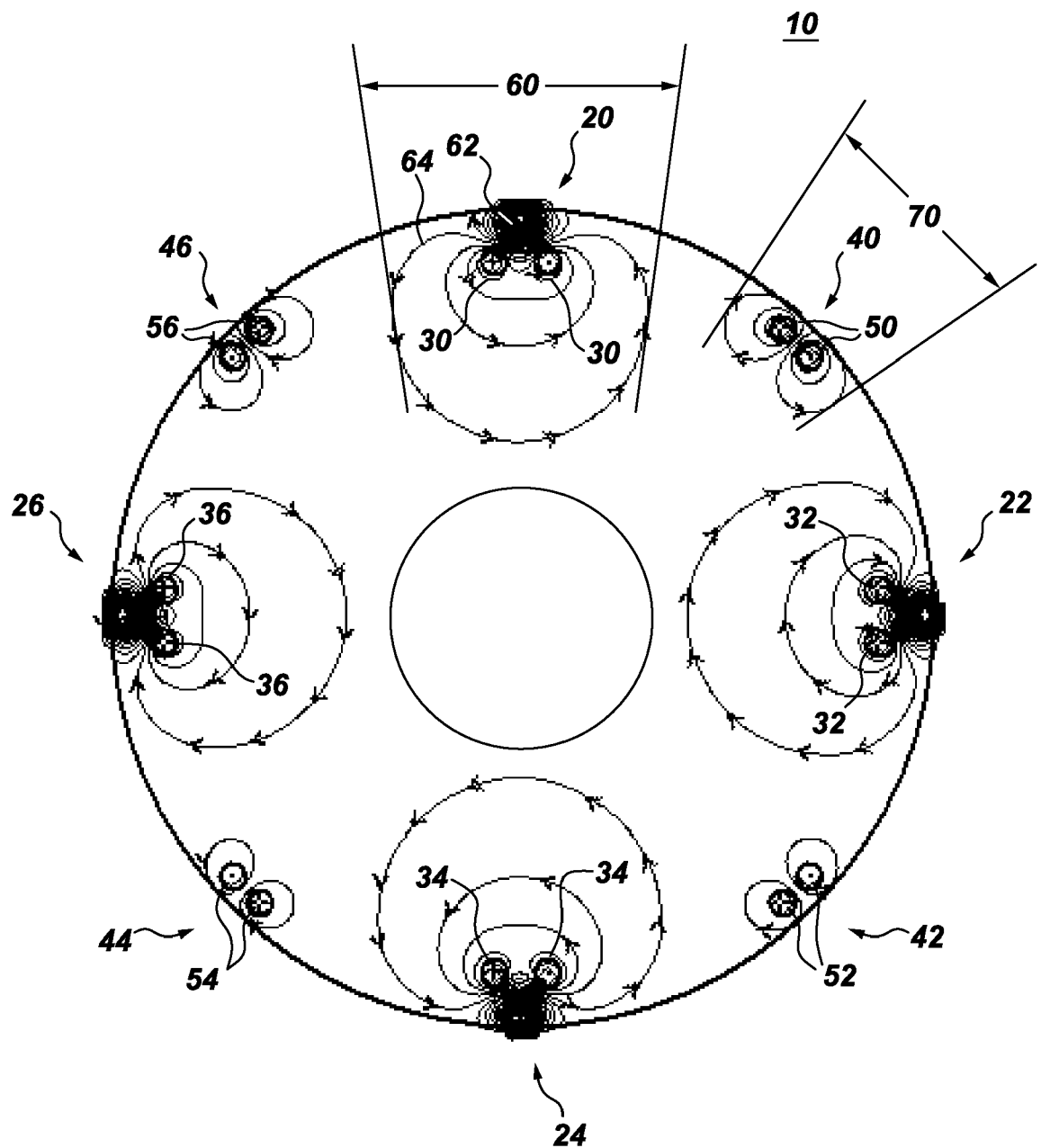
FIG. 1 is a cross sectional view illustrating a magnetic encoded shaft configured in accordance with one embodiment.

Referring to the cross-sectional perspective of an encoded hollow shaft 10 in FIG. 1, encoded polarized magnetic regions are shown for two distinct encodings disposed circumferentially about the shaft. A first set of primary encoded magnetic fields 20, 22, 24, 26 that each have primary domain boundaries 60 and have alternating polarities with respect to each other. In this example, the primary encodings 20, 22, 24, 26 each has a first layer 62 and a second layer 64 that are layered on top of each other. As noted herein, the depth of the encoding is directly related to the current penetration that in turn relates to the duration of the current pulse. In one example, the second layer encoding 64 is done first using a discharge resistor in a capacitor bank with a value that employs a discharge time constant that is sufficient to permit the deep current penetration. The first encoding layer 62 is then done using a discharge resistor with a different value that changes the discharge time constant that allows a lesser depth of the current penetration. As illustrated, in the center of this encoding arrangement, a magnetic domain boundary with parallel orientation to the shaft surface has been created between the two encoding layers 62 and 64. If a bending moment is applied to the shaft, a stress dependent magnetic field vector can be measured at the shaft surface.

In this example primary or first encoding 20 has a counter-clockwise magnetic field distribution while primary encoding 22 has a clockwise magnetic field distribution. The encoded magnetic regions 20, 22, 24, 26 are based on a pair of opposing polarity points 30, 32, 34, 36 for each respective region, and in this example there are four encoded regions 20, 22, 24, 26 located approximately ninety degrees apart. There is a space or area between each respective primary encoding 20, 22, 24, 26 however it should be understood that the number of encoded magnetic regions and the spacing between the encodings is dependent upon the particulars of the design such as the size of the shaft and the sensing requirements. In one example, these encodings are intended for bending moment or torque sensing and have a field strength applicable for sensing such properties of the shaft 10. One aspect of the rotating or contact sensing system is that bending moment sensing is generally more complex than other measurement and are typically too difficult for low speed rotating shaft with fixed (non-rotating) sensors. For example, if a torque is applied to the shaft, all sensors measure the same magnetic field change. In case of bending moments in vertical or horizontal direction, two opposite field sensors measure different field changes. In one example, sensor pairs are applied at four sensor locations to enable differential measurement. The accuracy and reliability of the sensing system can be increased in adding more sensor pairs.

In this example, a number of additional polarized magnetic regions 40, 42, 44, 46 are encoded into the shaft 10. These secondary encoded regions 40, 42, 44, 46 in this example are intended for a different type of sensing, such as position or speed. These secondary encodings 40, 42, 44, 46 typically have different encoding properties than the primary encodings 20, 22, 24, 26. It is noted that the use of first, second, primary and secondary is only intended to distinguish between the elements and is not intended to denote any other characteristics or preferences.

The secondary encodings 40, 42, 44, 46 each have a pair of opposing polarity points 50, 52, 54, 56 with corresponding polarity fields forming the secondary domain boundary regions 70 with void space between the secondary encoded regions 40, 42, 44, 46 and the primary encoded regions 20, 22, 24, 26. In this example there are four secondary encoded regions 40, 42, 44, 46 that are approximately ninety degrees apart from each other and interspersed between the primary encoded regions 20, 22, 24, 26.

The void space as referenced herein refers to areas with diminished or no appreciable encoded magnetic fields. The void space between the various encodings helps the sensing applications distinguish between the various encoded regions. In one embodiment, there are no void spaces and the encoded regions essentially occupy the entire shaft 10.

In the example shown in FIG. 1, one difference between the primary and secondary encoded regions are that the primary regions have two layers of magnetized domains on top of each other, and the layers can have opposing polarity with respect to each other. Another distinction includes the secondary encoded sections having domain boundaries that are perpendicular to the shaft surface. The secondary encoded sections allow measurements of the angular position or shaft speed by using a magnetic pick-up sensor, such as maximum/minimum detection. These secondary sensors may also be used to measure a torque dependent magnetic field, as described in more detail in U.S. application Ser. No. 12/134,689, filed Jun. 6, 2008.

The primary encoded regions enable sensors to measure a magnetic field component that is proportional to the shear stress caused by shaft bending. With several encoded sections as shown in FIG. 1 it is possible to measure bending moments in both the horizontal and vertical direction and to differentiate easily between the shear stress caused by torque and the one caused by bending moments. Basically, the same magnetic field sensors can be used for measuring magnetic flux density components that are proportional to torque or bending moments. The sensor location and the measurement task can be used to define the optimum vector orientation of magnetic field sensors (axial, circumferential or radial to the shaft).

In one embodiment, the asymmetrical load and bending moment sensing is accomplished by the rotating or contact sensors and is typically measured along the circumference of the shaft. In addition, the rotation of the shaft generates periodically alternating flux components that are measured by the non-contact sensors. Depending upon the intended application requirements, the multiple encodings allow for more data to be extracted during the rotation of the shaft that can provide more accurate and timely processing.

Figure 2:
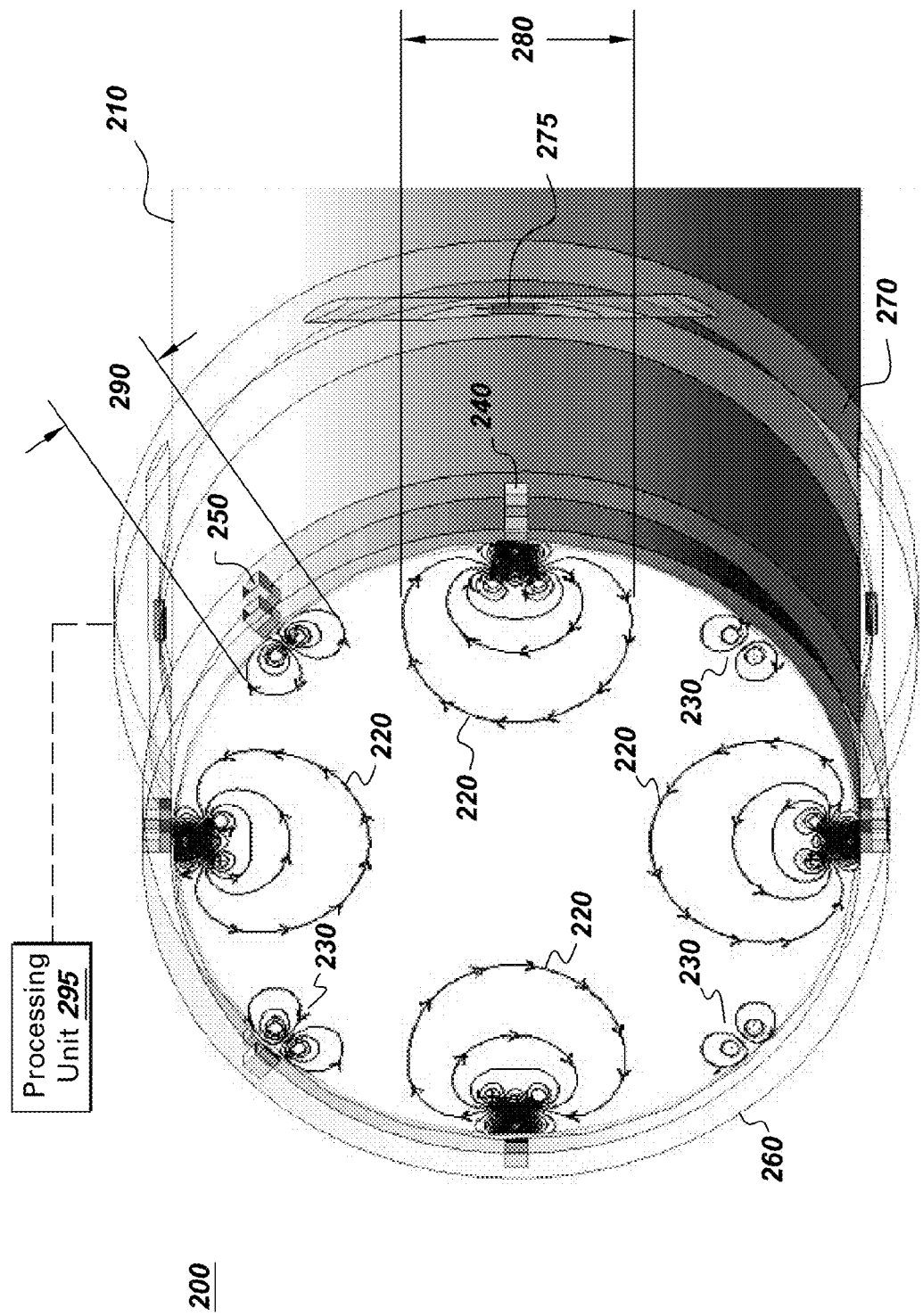
FIG. 2 is a cross sectional perspective illustrating a magnetic sensing system for encoded regions configured in accordance with one embodiment.

Accurate bending moment sensing is enabled by the system and processing according to one embodiment by disposing magnetic field sensors directly to the interior surface of a hollow shaft or the exterior surface of hollow or solid shaft. An additional sensing system can also be deployed using stationary sensors for measuring other properties such as shaft position, shaft speed as well as torque dependent magnetic fields. Referring to FIG. 2, a sensing system 200 is illustrated according to one embodiment for a hollow encoded shaft 210.

In one example, the primary encoded regions 220 and corresponding primary sensors 240 are used in combination as an accurate sensing system 200. The one or more primary sensors 240 for a particular primary encoded region 220 rotate with the shaft 210 and can be affixed directly or indirectly to the shaft 210 or in a fixture 260 within the primary domain boundary region 280 such that it can sense shaft properties such as bending moments and torque.

The fixture 260 in one aspect is a metallic ring that holds the sensors in position and can also serve to screen the sensors to minimize or eliminate interaction from external fields and sources. The fixture 260 can be other materials and shapes according to the design criteria.

When applying this sensing system in certain applications, such as in a wind turbine shaft, torque and bending moments tend to appear simultaneously. The torque causes a magnetic flux density/magnetic field in the primary encoded sections 220 of the shaft. The bending moments cause opposing magnetic field changes in the encoded sections 220 with 180° spacing. The use of multiple encoded sections 220 allows the primary sensors 240 to differentiate between torque and bending moments.

Additional secondary encoded sections 230 in one embodiment can provide more accurate torque and bending moment sensing results, especially under non-ideal conditions or if encoding is mainly sensitive for torque and not for bending moments. The secondary encoded regions 230 have secondary domain field boundaries 290 associated with the polarized magnetic fields of the secondary encoded regions 230. There is not much extra effort involved with encoding one or more secondary encoded sections 230 of the shaft 210 because the same encoding tools can be used. Furthermore, it may be beneficial to apply a different type of encoding for the secondary encoded sections 230 as compared to the "total force encoding" of the primary regions 220. In this exemplary illustration the magnetic domain boundary in the center of the primary encoded section 220 is parallel to the shaft surface, whereas the magnetic domain boundary in the center of the secondary encoded section 230 is perpendicular to the shaft surface. Therefore, different mechanical load dependent magnetic fields can be measured at the shaft surface (while both sections experience the same stress). Evaluating the magnetic fields above sections with different type of encoding enables to eliminate measurement errors.

According to this example, there are one or more secondary sensors 250 within the secondary encoded field boundaries 290, wherein the secondary sensors 250 rotate with the shaft 210. The secondary stationary sensors 250 can be used for sensing properties of the shaft 210 such as the bending moments and torque such that the additional sensor data provides more accurate sensing.

The primary and secondary sectional encoding 220, 230 in this example have different encoding patterns to get a more robust and accurate sensing system. The primary or secondary sensors in one example are aligned such as for measuring magnetic field changes in circumferential, axial or radial direction. The alignment depends on the encoding method and sensor position and could be different for the primary sensors 240 and the secondary sensors 250.

In addition to the rotating sensors 240, 250, a further embodiment includes stationary sensors 275 that can extract information from the encoded sections 220, 230. The stationary or non-contact sensors 275 can be affixed to the shaft housing or in a non-contact fixture 270 such that it can sense the shaft properties such as shaft position and speed. The fixture 270 in one aspect retains the stationary sensors 275 and is coupled to the housing structure, such as a wind turbine frame, and is stationary with respect to the rotating shaft 210.

The stationary sensors 275 measure shaft properties such as the angular shaft position and shaft speed and enable more accurate torque and bending moment measurements. The data from the stationary sensors 275 can aid in transforming the sensor information from the rotating coordinate system to fixed coordinates. In one embodiment, the stationary sensors 275 are an option for monitoring features such as the rotor position. For example, the angular position of the shaft can be measured from the magnetic field measurable close to the shaft surface, since the four encoded sections 230 have slightly different magnetic properties.

Alternatively, an existing encoder for monitoring the shaft position can be employed. Another options is the use a pitch control/asymmetrical load control directly in the rotating system without transformation into a fixed coordinate system. The advantage of using a rotor or shaft position measurement based on magnetic encoding is that all relevant measurement information from the shaft such as torque, bending moment, speed and angular position can be derived from the same sensing system. This enables a cost effective design because all encodings can be based on the same tools, created in the same manufacturing step and all sensors are based on the same devices.

The data from the sensors is typically processed by a processing unit 295 that can be co-located with the housing or located separate from the shaft sensing assembly 200. In one example the sensor data from the rotating sensors 240, 250 is sent via the slip rings or by way of wireless communications. The data from the stationary sensors 275 can be communicated by wire or wireless methods. Wireless communications such as RF transmitters can be integrated as part of the sensing system and mounted about the wind turbine shaft and transmit the signals to a receiver of the processing unit 295. The processing unit 295 can be any of the processors known in the field such as microprocessors and other computing devices. The processing unit 295 in one example is part of a system control that utilizes the sensor data to modify system parameters for safer and more efficient control of the system associated with the shaft sensing system 200.

Generation of the magnetically encoded polarized regions and any neutral or void zones therebetween enables generation of a torque dependent field component in the surroundings of a rotating shaft, so that the shaft characteristics can be measured. One embodiment for measuring the shaft characteristics is by attaching magnetic field sensors directly on the shaft in the encoded regions thereby providing high sensitivity. Another aspect relates to encoding of additional encoded magnetic regions that are used for additional sensing capability wherein the encoding and sensing are different with respect to the other encoded regions and sensors.

The magnetic field sensors can be oriented in a circumferential direction to measure magnetic field components that are tangential to the shaft surface and perpendicular to the magnetic domain boundaries. In one example, the magnetic field sensing is accomplished by using magnetic field sensors located about the large diameter shafts, wherein the shafts are rotating at low or moderate speeds. The sensors measure the magnetic flux and/or the strength and direction of a magnetic field and can be based on several types of sensors including magnetoresistive devices, flux gate or coil sensors, Hall Effect sensors, and/or magnetoinductive sensors. Selecting the specific magnetic field sensor depends upon design criteria and includes certain aspects such as flux density, resolution, accuracy, and number of axes. With respect to the shaft, the sensors can be located to maximize the measured response, such that the sensors can be oriented for example at 0 degrees, 45 degrees and/or 90 degrees. Different types of sensors can be utilized to obtain various data from the shaft, and there can be sets of sensors to obtain additional data or to provide redundancy.

According to one embodiment, the wind turbine system deploys a plurality of sensors and therefore obtains greater sampling rate, greater reliability, and redundancy. In another example, different types of sensors are deployed such that different types of data can be measured. For example the different sensor types can be used to differentiate torque from bending moments. The multiple sensor types can take advantage of the sensing properties of the particular sensor or otherwise allow for enhanced sensing functionality. In a further embodiment, the sectional encoding process includes different encoding sections having different encoding properties such that the sensors can obtain multiple forms of data.

Figure 3A:
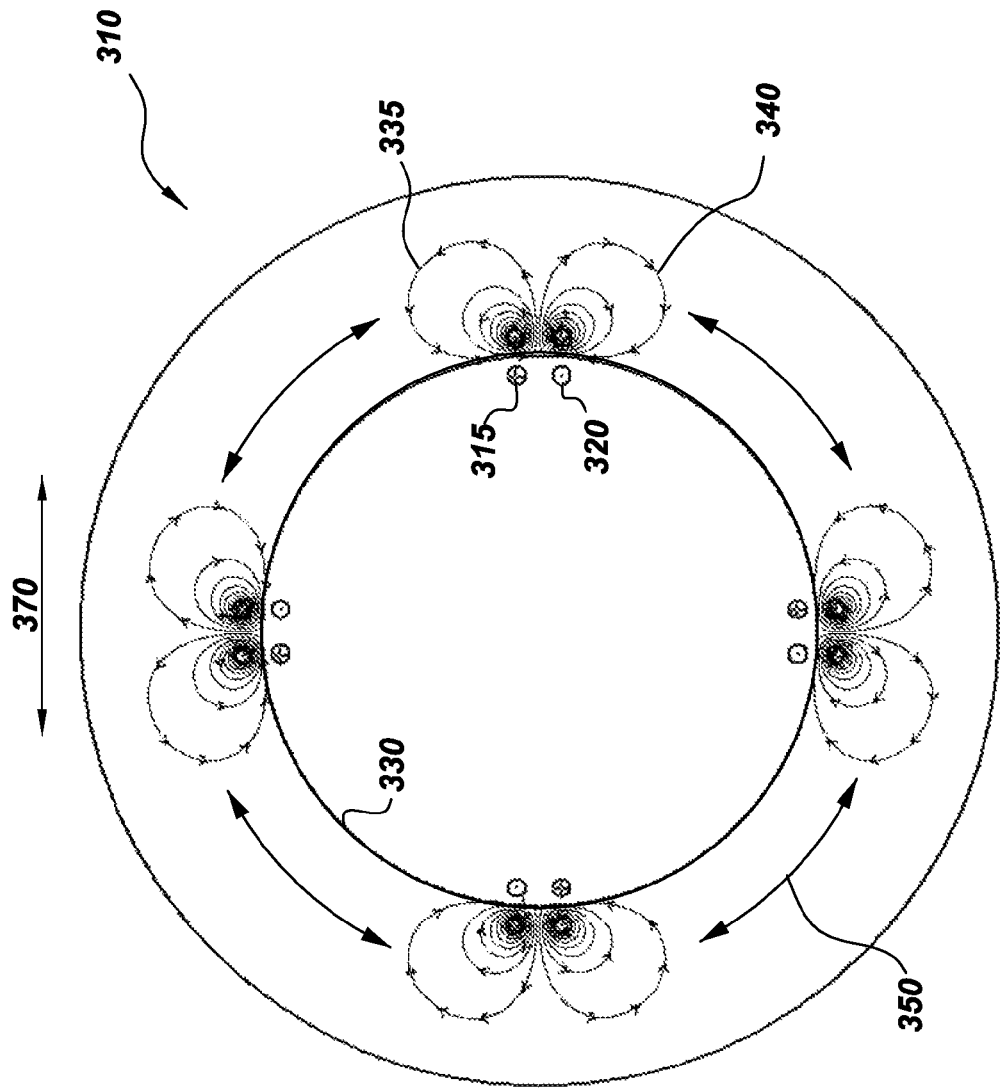
FIG. 3a is a cross sectional view illustrating magnetic encoded regions on an interior surface of a hollow shaft configured in accordance with one embodiment.

Referring to FIG. 3a, a side view perspective of encoding of an interior surface of a shaft 310 is shown, wherein the shaft 310 is hollow and there are a plurality of positive encoding members 315 and negative encoding members 320 are located in the hollow section proximate the interior surface 330 of the shaft 310. The conducting members 315, 320 are paired with opposing polarities and located in close proximity to each other with a small gap therebetween. The members 315, 320 are typically coupled to a frame or fixture (not shown) to maintain the members in proper orientation, wherein the frame is typically made of a non-conducting material. There is generally an electrical coupling from a power source (not shown) to the members 315, 320 providing the current to generate the magnetic field and permanently encode the shaft 310.

As indicated, the encoding process generates opposing polarized magnetic fields 335, 340 in the shaft 310 with the field lines corresponding to the polarity type of the members 315, 320. The magnetically polarized regions 335, 340 have respective boundaries 370 and there are typically void or neutral zones 350 between the boundaries 370 with no relevant magnetic fields.

One embodiment for sectional magnetic encoding is depicted in this example with the four pairs of conducting members 315, 320 located about the interior of the shaft 310 and oriented with the domain boundaries approximately ninety degrees from each other. Each pair 315, 320 is used to create magnetically polarized regions with domain boundaries and neutral zones 350 therebetween. Each pair of conducting members 315, 320 can be coupled to an encoding source (not shown) that provides the different polarities to the members in each pair in order to generate the alternating polarized magnetic fields. In one embodiment, there are little or no neutral zones 350 and the magnetically polarized regions occupy the entire shaft 310.

Referring again to FIG. 3a, there are four pairs or eight encoded regions on the shaft 310 generated by the four pairs of conducting members 315, 320. Thus, well defined magnetic polarized regions each having four magnetic domain boundaries 370 can be achieved without having to magnetize the entire shaft 310.

For example, the conducting member 315 employs a positive polarity encoding while the paired conducting member 320 uses a negative polarity encoding. The corresponding polarized magnetic regions 335, 340 resulting from the encoding have a domain boundary region 370 that represents the location of optimal response from the shaft.

For illustrative purpose, some wind turbine main shafts are hollow, and the encodings are interiorly disposed on the inner surface of the hollow shaft. One feature for the interior encoding relates to better protection of the sensing system against external disturbances such as electromagnetic interference (EMI), lightning, and accidental damages cause by operating personnel. However, the encoding could also be applied on the outer shaft surface that typically provides even higher sensitivity for mechanical stress, e.g. bending moments. According to one further embodiment, the encoding is applied to both the interior surface of the shaft and the exterior surface of the shaft allowing greater flexibility and enhanced measurement capability of the shaft.

Figure 3B:
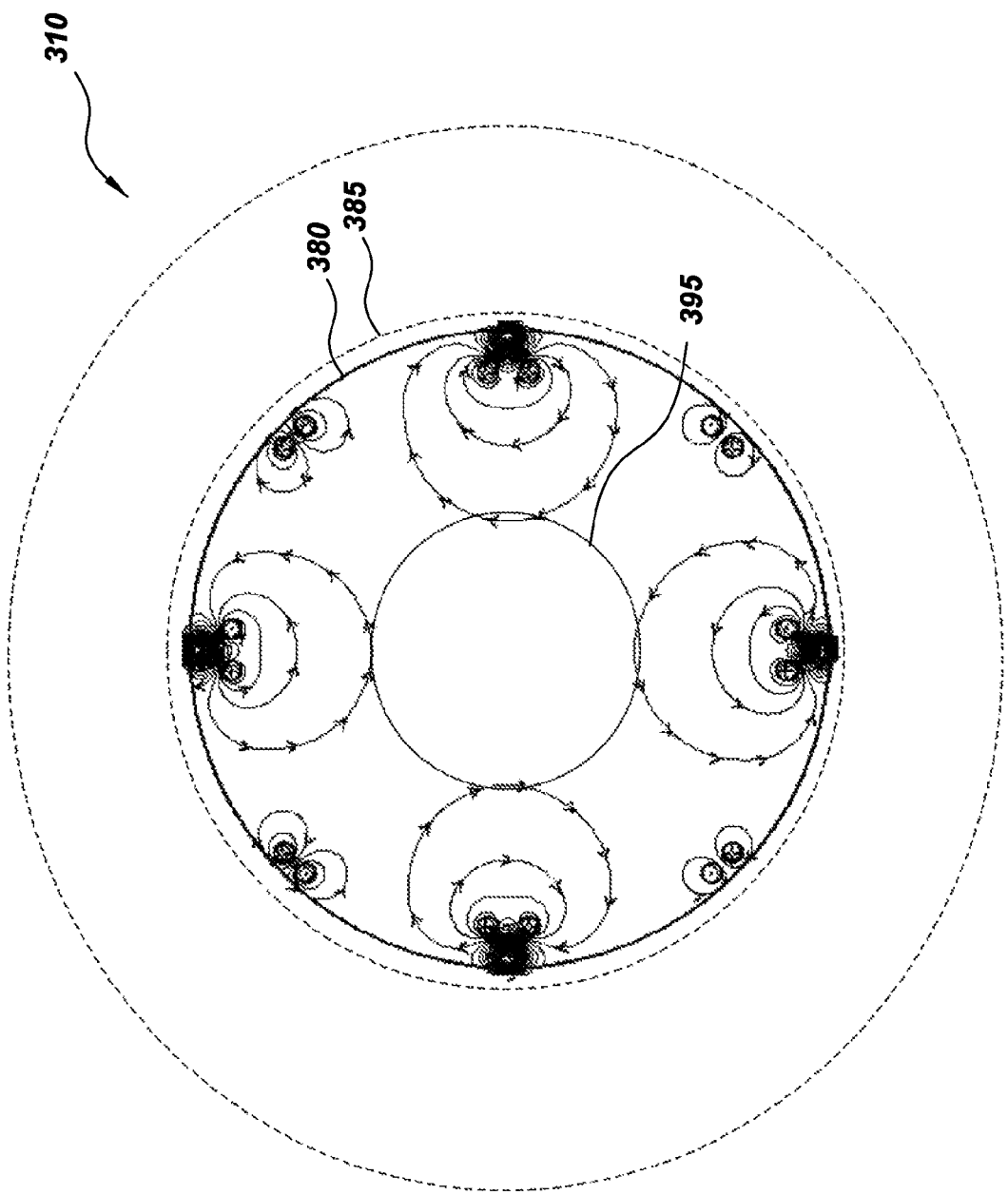
FIG. 3b is a cross sectional view illustrating magnetic encoded regions on an insert to the interior surface of a hollow shaft configured in accordance with one embodiment.

Referring to FIG. 3b, one embodiment for implementing encoded regions to a shaft 310 is via coupling one or more encoded sections 380 to the shaft 310. Note that the dimensions are not drawn to scale in this example. According to this example, one or more separate encoded sections 380 are coupled on the interior surface 385 of the hollow shaft 310. The encoded section 380 can be affixed onto the interior surface 385 of the shaft 310 such that a new interior surface 395 of the encoded section 380 results. The encoded section 380 can be secured into a groove in the shaft 310 or otherwise fastened such as by use of adhesives, soldering, and welding. In this exemplary illustration, the optimal position for the magnetic field sensors is between previously encoded section 380 and the shaft 310, thus being screened against external magnetic AC fields. As should be readily apparent, the encoded section can be applied to the outer surface of the shaft to impart encoded sections on the outer portion of the shaft. The encoded sections 380 can also be divided into smaller sections and be placed on the interior or exterior of the shaft and be encoded in-place or previously encoded and coupled to the shaft surface.

Figure 4:
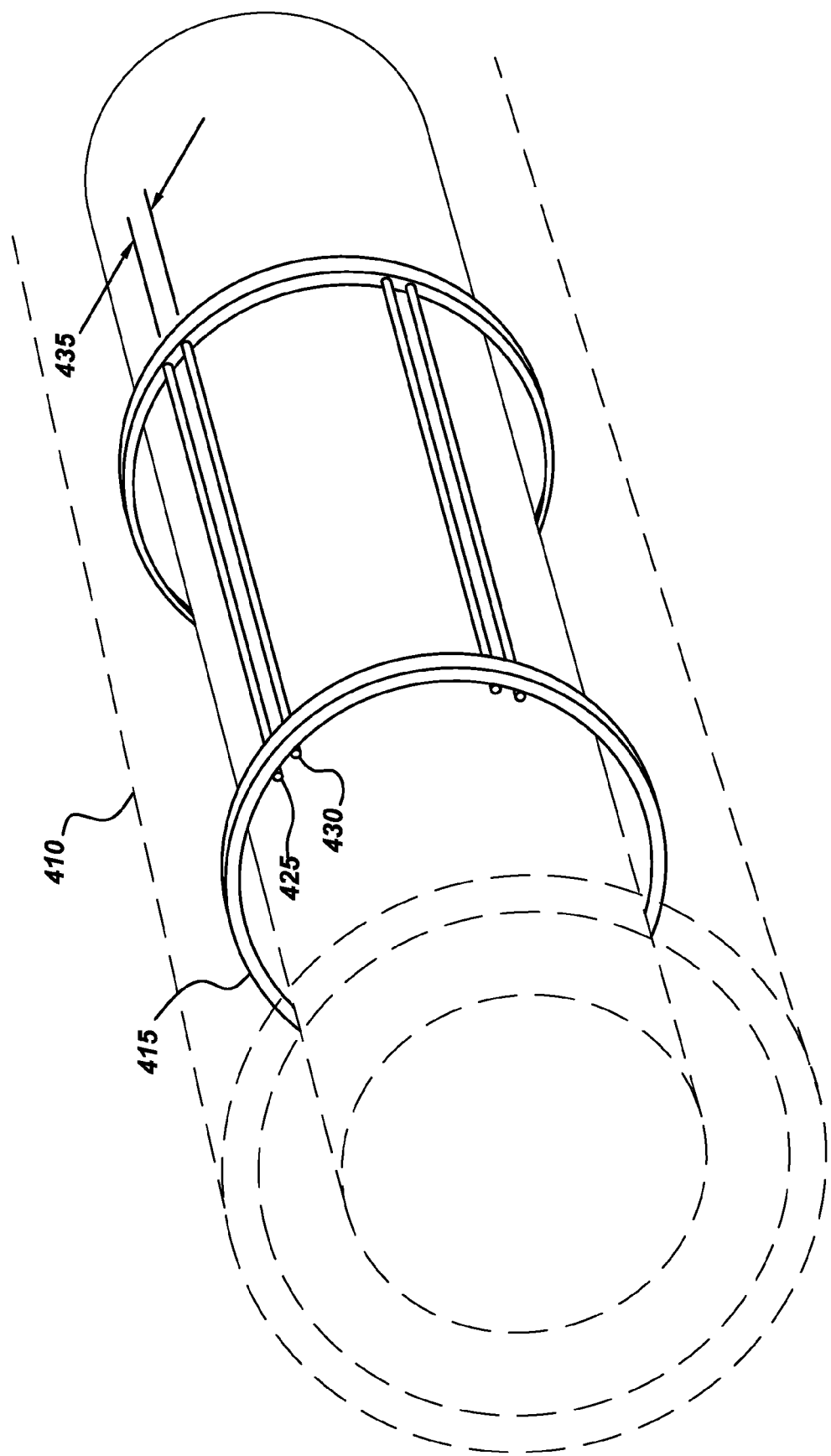
FIG. 4 is a diagram illustrating an implementation of an encoding system of FIG. 3a configured in accordance with one embodiment.

Referring to FIG. 4, an encoding configuration is illustrated with the hollow shaft 410 shown in relief in order to show the encoding system interiorly disposed within the hollow shaft 410. In this embodiment, the paired conducting members 425, 430 are coupled about a non-conducting frame 415 wherein several paired conducting members can be positioned about the frame 415. The paired conducting members 425, 430 are typically located in proximity to each other approximately parallel and separated by a gap 435.

The conducting members 425, 430 are generally coupled to two encoding sources (not shown) such that the members 425, 430 are coupled with opposing polarity. The encoding source in one example is two electrically separate sources, such as capacitor banks, to ensure two independent current paths flow in the shaft. There are connections that electrically couple one end of the conducting member 425, 430 to the encoding source while the other end is electrically coupled to the shaft 410. The encoding in one embodiment produces sectional magnetic encoding sections that are paired and establish isolated domain boundaries with respect to each other such as shown in FIGS. 1-3a.

The encoding of magnetic polarized regions or channels according to one encoding embodiment is described. As previously noted, the hollow shaft 410 can be a ferromagnetic material or have disposed upon it at least a section of ferromagnetic material affixed to the shaft. The encoding can be accomplished in a number of manners and one manner of operation disposes conducting members 425, 430 such as cables or metallic bars that are arranged about the shaft 410. As depicted, the conducting members 425, 430 extend along the shaft 410 longitudinally, although they may also extend circumferentially or diagonally in other embodiments.

In more particular detail of this embodiment, an encoding system is disposed about in at least a section of the shaft 410. The encoding system in this example deploys a unit 415 that is coupled within the shaft 410 during encoding such that the conducting members 425, 430 extend along at least a portion of the shaft 410. The conducting members 425, 430 in this embodiment are arranged such that there are positive and negative encoding conducting members 425, 430. The frame 415 is typically a non-conductive material such that the conducting members 425, 430 are isolated pairs.

The encoding can be done during manufacture of the shaft or post installation and is permanent when applied to the right type of material and created with high current densities. The encoding structure in this example is depicted within the shaft 410 and may include additional frame elements (not shown) to maintain its orientation and position about the shaft. This may include frame supports (not shown) to ensure the conducting members are arranged properly and sufficient for the encoding operation. For large diameter shafts or for more precise measurements, additional encodings can be employed to add further magnetic polarization regions and corresponding boundaries. These additional encodings can be accomplished by rotating the fixture with its existing encoding members or by having more encoding members in the fixture.

While the depicted system is shown located within a section of the shaft 410, in another embodiment the exterior surface of the shaft is encoded. In a further embodiment, there are multiple encoding structures arranged about the shaft such that each of the encoding structures generates the magnetic polarized regions.

The conducting members 425, 430 disposed within and proximate the shaft 410 with a gap between the member 425, 430 and the interior surface of the shaft 410. According to one example, the conducting member 425, 430 are reinforced isolated copper bars, although other suitable conductors are within the scope of the system. The conducting members 425, 430 can be bars with a shape that can be round, oval, square or rectangular, for example. The length can vary depending upon the design criteria. Longer conducting members 425, 430 can provide greater surface area for sensing. The diameter of the conducting members 425, 430 should have sufficient rigidity and provide for the required current pulses. In one example, the bars can be less than one inch or several inches long and have a diameter ranging from $\frac{1}{16}$ inch to $\frac{1}{2}$ inch. The conducting members in one example include rigid or semi-rigid bars that define a relatively straight path for the current flow in a longitudinal direction, circumferentially or diagonally along the shaft.

The conducting members 425, 430 have a first end and a second end and for illustrative purposes the first end shall be coupled to respective encoding sources and the second end shall be coupled to the shaft 410. In one embodiment there are two electrically separate sources to ensure two independent current flow paths. In order to electrically couple the conducting members 425, 430 to the encoding source with electrical connections provided at the first end of the conducting members 425, 430. There are first end electrodes that are used to establish electrical connections from the shaft 410 to the encoding source. There are second end electrodes that are used to establish electrical connections from the second end of the conducting members to the shaft 410. The first and second end electrodes refer to the electrical coupling to the shaft 410 and in one embodiment the first end electrodes are conductive elements coupled about the non-conductive frame 415 that contact the shaft 410. The second end electrodes in one embodiment refer to a conductive element that extends from the second end of the conducting members 425, 230 to the shaft 410. The electrodes can also be points of contact with jumpers or wires that connect to the shaft 410.

For the positive conducting members, the encoding source positive terminal is coupled to the first end of the positive conducting members along the positive electrical connector. The encoding source negative terminal is coupled to the electrode and the shaft via an electrical connector. For the negative conducting members, the encoding source negative terminal is coupled to the first end of the negative conducting member along electrical connection. The encoding source positive terminal is connected to the electrode and the shaft via an electrical connector.

In one embodiment, electrical signals travel through the shaft 410 such that magnetized regions are generated therein. One of the features of this encoding system is the ability to magnetically encode channels or magnetic polarization regions in the shaft. In particular, steel shafts have a high relative permeability and the electric currents that travel through the steel shaft create distinct encoded channels.

One example of the sectional magnetic encoding uses four pairs of conducting members uniformly distributed approximately ninety degrees apart. The positive polarity current pulse is coupled to the conducting member and the current pulse travels along the conducting member to an electrode that contacts the shaft about the second end. The current discharged by the electrode travels back along the shaft to the first end electrode and the negative connection of the encoding source via the electrical connector. The current flowing along the shaft creates a polarized magnetic channel on the shaft. Each of the adjacent conducting members in the structure, would have alternating polarities and the pulse encoding may simultaneously encode the conducting members all at one time, grouped, or individually. For example, the first set of positive conducting members can be encoded simultaneously followed by the negative set of conducting members.

The current penetration, namely the depth and width of the current density in the shaft, is typically controlled by the duration of the current pulse. The current pulses are unipolar in this example, and are positive current pulses without the negative half-wave, or without the positive half-wave if negative current pulses are applied. In one embodiment, the current pulses are generated by discharging a capacitor bank, wherein the size of the discharge resistor [Ω] and the size of the capacitor bank [μF] determines the discharge time constant p=R·C and therefore the depth and width of the current penetration. Another way of generating current pulses with variable pulse length is to use a controllable current source injecting the current with the desired shape into the shaft.

According to a simple encoding approach, a magnetized section is encoded one circuit at a time. For example, a positive polarity current pulse can be applied to encode a first encoded section followed by another section magnetized by applying a second circuit with a negative polarity. Subsequent sections are encoded using alternating polarity current pulses.

Layered encoding such as the first and second layers for the primary encoding of FIG. 1 can be accomplished by applying the current pulses and varying the discharge resistor value and therefore the current penetration.

Such a sequential encoding process with alternating polarity current pulses creates multiple almost identical encoded sections. If only one current pulse is applied to each section to be magnetized, the sections are generally not identical because magnetizing the second section also affects the first magnetized section. Almost identical encoded sections can be achieved in performing multiple sequential current pulses, alternating the sections while magnetizing and by performing the magnetic field measurements close to the regions where the electrodes contact the shaft. Another example for sequentially creating magnetized zones in the shaft measures the field strength created in each segment or zone and adapts the amplitude of the current pulses for the subsequent encoding steps.

To avoid that the influence of sequential magnetization of one section by the next magnetization, another encoding embodiment is to apply the same current amplitude to all the conducting members and encoding all the sections at once. In one embodiment, the conducting members would use separate or split encoding sources to accommodate the multiple conducting members. In one example, separate capacitor banks are used for each conducting member. In another example, separate controllable current sources are used for each conducting member.

For example, if there are four segments, two encoding sources can be used to apply the same current pulses to each of the four current encoding sources with opposite polarities. In another example, there are eight separate encoding sources thereby avoiding short circuits between the different encoding currents during the encoding process. In another example, a switching scheme can be employed to apply the current pulse signals with alternating polarities.

While the conventional techniques rely upon total circumferential shaft magnetization, one embodiment of the system herein encodes magnetic channels in the shaft using the return currents. The sectional magnetic encoding takes advantage of the asymmetrical skin effect and that a current always takes the path of least impedance. The impedance is dominated by inductance if the frequency of the current is high enough. In the case of a short current pulse the return current flowing in the shaft will be more localized than in the case of a longer pulse, enabling polarized and well defined/narrow magnetic patterns. This effect is used to magnetize sections of a shaft with more localized channels that lead to higher magnetic flux densities at the same encoding current amplitude. One advantage of the high magnetic flux densities at comparably small encoding currents is that the encoding source can be much smaller than with encoding source designs that aim at magnetizing the whole shaft surface, in circumferential direction.

The sectional encoding can be performed in several ways including encoding only one or more shaft sections. According to one embodiment, the sectional magnetic encoding is performed to create multiple encodings along the circumference of the shaft, typically performed during the production phase. Magnetostrictive measurements can be accomplished with the encoded ferromagnetic shafts, such as industrial steel. The magnetic encoding thus turns the shaft into a component of the sensing system such that when a mechanical torque or bending moment is applied to the shaft, a force dependent magnetic flux appears in the direct environment of the encoded region of the shaft (for example, 0.2 mT at a distance of a few millimeters from the shaft surface) and can be picked up by magnetic flux density sensors, such as Hall sensors, fluxgate sensors or induction coils. The sensors are typically low cost enabling multiple redundancies and are well suited for integration into the wind turbine drive train design because they are small.

In some embodiments where mechanical load conditions are to be measured, such as shaft torque and/or shaft bending moments, the highest sensitivity can be achieved in placing the magnetic flux density sensors close to the region where the electrodes of the conducting members contacted the shaft during the encoding process. This characteristic enables the use of encoding tools with a similar design as shown in FIG. 4 but with relatively short axial dimensions such that the radius of the encoding tool is shorter than axial dimension. This is relevant for applications where smaller axial space, for example a few centimeters, is available for a torque or bending moment measurement system. Certain conventional torque measurements based on magnetic encoding require substantial axial space. It should be noted that the axial length of encoded channels is not relevant in some embodiments.

According to one example, the encoding for sensing bending moments uses two or more encodings. The encodings can be layered onto the shaft and such as shown in FIG. 1. The encodings can also be located along a different section of the shaft or include interiorly disposed encodings within the hollow center of the shaft, or some combination thereof. In a further example, the primary encodings can be deployed on the exterior of the shaft and the secondary encodings can be deployed onto the interior of the shaft with respective sensor deployment.

Figure 5:
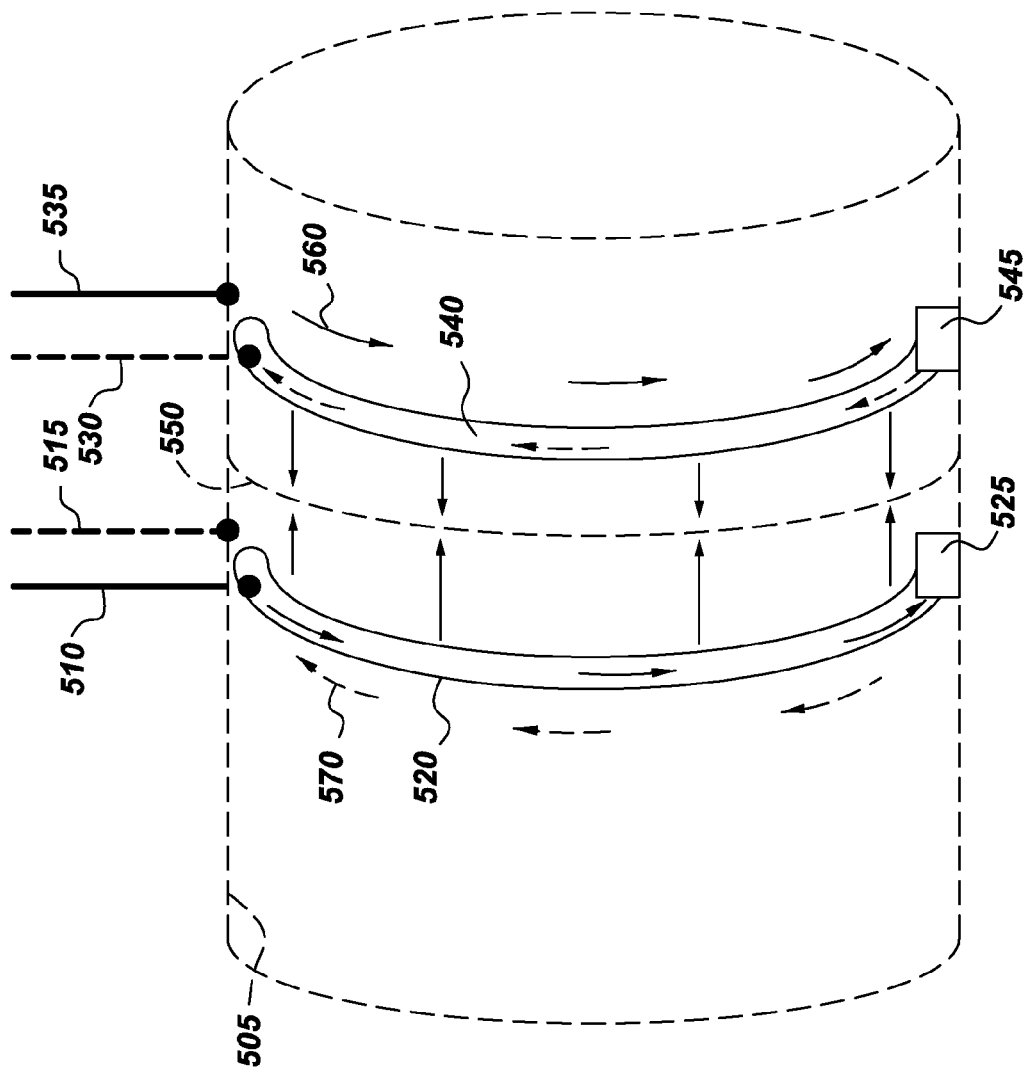
FIG. 5 is a perspective view illustrating circumferential encoding configured in accordance with one embodiment.

Referring to FIG. 5, a further embodiment of encoding is depicted for magnetically encoding and creating magnetic domain boundaries on the shaft along the radial circumference of the shaft 505. In this example, the encoding is on the interior surface of the hollow shaft and there are arc segments 520, 540 positioned about a segment of the shaft 505. One conducting arc segment 520 is coupled to a positive polarity encoding source (not shown) on a positive end 510 such that the encoding currents travel along from the positive end and along the arc 520. In this example, the other end of the conducting arc segment 520 is coupled to the shaft 505 by an electrode 525 in contact with the interior surface of the shaft 505. The encoding current pulse thus travels along the conducting member 520 with the return currents traveling along the interior surface 570 of the shaft 505 to the return electrode at the return end 515 that is electrically coupled to the encoding source (not shown).

The other conducting arc segment 540 is coupled on a return end 530 to the encoding source (not shown). The encoding signals travel from the encoding source (not shown) to the positive end 535 via an electrode in contact with the shaft 505 along the interior surface 560 of the shaft and through the electrode 545. The encoding currents travel along the arc segment 540 and return via the return end 530 to the encoding source (not shown). Once again, this encoding generates sectional magnetic regions about the circumference of the shaft 505. The combination of the pair of conducting arc segments 520, 540 that create the polarized magnetic regions also creates the domain boundary 550 therebetween that is the optimal sensing region.

In this example, there are two polarized regions orientated in an axial direction to the shaft. The magnetic field itself is not angular position dependent in the encoded region and the magnetic field can be oriented at any position. In another example, the magnetic field can have a defined position dependence in the circumferential direction. It should be readily apparent that while depicted as an arc segment of about a semi-circle, the arc segments can be a small portion of the shaft or larger portions of the circular circumference. Furthermore, while the arc sectional magnetic encoding shown as being circumferential along at least a portion of the shaft, the encoded channels can be along any direction of the shaft such as diagonal for the magnetic polarized channels. According to one embodiment the encoding is disposed on the exterior surface of the shaft. In another embodiment multiple arc sectional magnetic encodings are circumferentially disposed about the shaft in a similar fashion as is shown in FIG. 1.

Figure 6B:
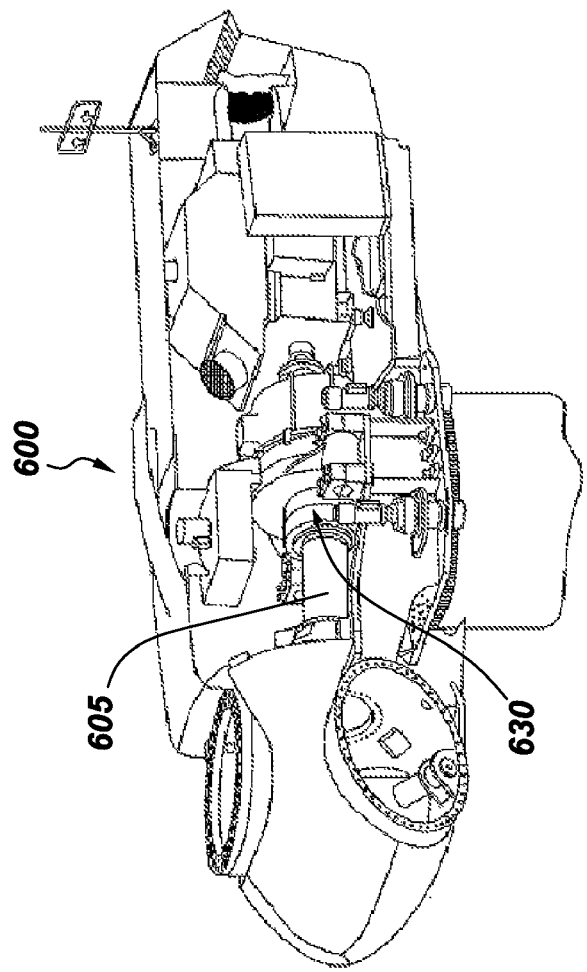
FIG. 6b shows a perspective view of an implementation of the sensing system deployment of FIG. 6a in accordance with one embodiment.
Figure 6A:
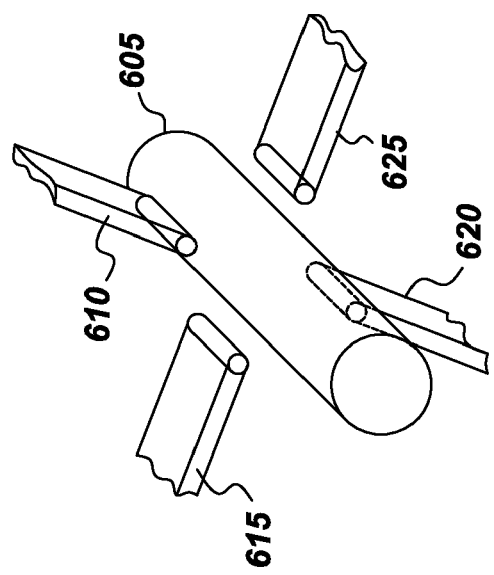
FIG. 6a shows a block diagrammatic perspective view of a deployment of the sensing system in accordance with another embodiment.

Referring to FIG. 6a, one embodiment of a simplified measurement system is depicted. In this example, the magnetically encoded shaft 605 includes a plurality of polarized magnetized regions with magnetic domain boundaries therebetween caused by encoding pulses with alternating polarities in each of these sections. The number of magnetically encoded polarized regions depends upon the encoding and the design criteria, such as the diameter of the shaft. In operation, when the shaft 605 is not subject to torque or bending, the magnetic flux paths mainly reside within the shaft material. Upon the application of some torque or bending moments of the shaft 605, discontinuities of flux components at the magnetic domain boundaries create an additional magnetic field in space (outside the shaft material) that is measurable by one or more of the sensors 610, 615, 620, 625.

In this example, the non-contact or stationary sensor units 610, 615, 620, 625 reside at some small distance from the shaft 605 and are oriented to detect the magnetic fields. The sensor 610, 615, 620, 625 can be the same or similar type sensors and oriented in the same or similar plane with respect to the shaft 605. In another embodiment, the sensors 610, 615, 620, 625 are oriented in different manners such as different angles to be able to detect different measurements. While in yet another embodiment, the sensors 610, 615, 620, 625 are of varying types configured to detect different properties. In one example there are sensors 610, 615, 620, 625 enable differential measurements that pickup the magnetic flux densities caused by the main shaft under load.

The measured data is typically subject to subsequent processing to determine the characteristics associated with the shaft based on the measured magnetic field data. The sensor data is typically communicated to a processing unit such as a microprocessor or computing device that uses the sensor data for various purposes such as system control. In one example the data is communicated by a wired or wireless infrastructure. The sensor data may also be communicated via slip rings that are used on many wind turbine shafts.

Since wind turbine main shafts typically have slip rings to extract signals from the slowly rotating shaft, magnetic field sensors can also be directly deployed on the shaft surface, in proximity to the magnetic domain boundaries, such that the sensor system would be rotating with the main shaft, enabling very accurate torque and bending moment output signals because the sensors produce the same magnetic field output at all rotor positions. Thus, such rotating sensors can be permanently installed in the main drive shaft with the magnetic field or bending moment signals transmitted via existing slip rings or wireless communications.

Referring to FIG. 6b, the shaft 605 is a main wind turbine shaft and is deployed within a wind turbine assembly 600 such that the sensors are inside a portion of the housing 630. In one embodiment, the sensors include rotating sensors coupled in contact with the shaft as well as non-contact sensors and are all deployed in the housing 630.

In one wind turbine embodiment, sensors are interiorly installed inside the shaft proximate the region of the encoded zones together with a signal conditioning unit. The torque and bending moment signals would then be transmitted to the control system via existing slip rings. One advantage of encoding the inside of the shaft is that these zones and the instrumentation are not accessible once the turbine is installed and are well protected against external fields. Since the wind turbine main shafts or low speed shafts rotate slowly other possible sensors include fluxgate, Hall effect, anisotropic magnetostrictive, and giant magneto-resistive (GMR) sensors can be applied.

In one embodiment, it is desirable that the sensors operate in pairs and work in a differential mode of operation, since this makes them more robust against common mode types of disturbances, such as the ambient temperature or external magnetic fields and provides symmetrical responses to torques of opposite directions. In one example, the first sensor pair is oriented with respect to the shaft at a different angle than the second sensor pair.

In certain applications, when applying sectional magnetic encoding, it is difficult to accurately achieve the same flux distribution and/or magnetization in all shaft sections. There are several causes for the lack of consistency between sections, such as the magnetic encoding tools applied subsequently to different sections, material inhomogeneities, and differing magnetizing current densities applied to the shaft sections. This is particularly relevant when the magnetizing tools cannot be connected simultaneously and in series with the sections. Due to the differences in the magnetic properties between the encoded channels, sensing the same torque or power with identical sensors over different magnetically encoded shaft sections might lead to inaccurate results. Therefore, the magnetic field sensing in one embodiment is based on a method and system where the measurement values are based on an integration method. The integration typically involves several factors for the integration processing. The integration typically includes at least one full revolution of the shaft.

Another possibility of overcoming a lack of consistency between magnetized sections is to use sensors that are directly attached to the shaft surface, such as the sensors 250 in FIG. 2. Associating the sensors directly with a magnetized region enables the system to calibrate each combination of sensor and magnetized region. In applying different amplification factors in the sensor signal processing, the same sensitivity (V/Nm) in the sensor output signal can be achieved even though the magnetized sections have slightly different magnetic properties.

Referring to FIG. 7a, a further embodiment of the sensing system for illustrative purposes is within a wind turbine assembly 700. In this embodiment, sensors 720 are interiorly deployed within the main drive shaft housing 725 of the wind turbine structure 700. The sensors 720 in one embodiment are small rotating sensors affixed along the interior wall of the shaft 730. In one aspect the sensors are affixed by adhesive. FIG. 7b illustrates a different perspective of the sensing system with sensors 720 deployed within the wind turbine housing 725 and in close proximity to the shaft 730.

In one embodiment, the measurement data from the sensors 720 are communicated via the slip rings (not shown) in the system. The communicated data is then processed to determine the various torque and bending moments of the shaft. A feedback system processing can be implemented to make adjustments to the wind turbine operation according to the measurements.

In one example, the sensors can be deployed within a sensing frame assembly along a portion of the circumference of the shaft or disposed about the entire circumference. In other embodiments, the sensors are integrated into existing shaft housings such that a separate sensor assembly is not required and the integrated structure performs the functionality of the sensor assembly. The housing can provide a plurality of sensor slots such that any number of sensors can be deployed.

For wind turbine applications, the speed of the shaft is low and the sensors can be affixed to the shaft, interiorly or exteriorly and still provide satisfactory results since the changing contact behavior with time is not critical as only the sensor distance to the shaft has to remain constant over time. A further aspect combines several conventional sensors such as speed, angular position, torque and/or bending moment in one long-term stable sensing system that is permanently encoded into the drive shaft. There is generally low additional cost involved with encoding multiple magnetic field sections into the shaft and the corresponding magnetics field sensors affixed to the shaft are low cost.

Since wind turbine shafts rotate slowly, a compact signal processing unit can be installed within the rotating system. Signals from several magnetic field sensors are the input signals for this processing unit, delivering torque and bending moments in the x and y direction as output. Wind turbines typically have slip rings that enable a signal and low power interface to and from non-rotating parts of the turbine, e.g. for the output signals and power supply and the of the processing unit. The data from the magnetic field sensors can also be directly communicated for subsequent processing using the slip rings or other, non-contact or wireless signal transfer embodiments known in the art. A signal processing unit can also be deployed proximate the rotating shaft or housing to enable processing of the data wherein the processed data can be communicated via various means for system level usage.

As noted, slips rings can be used to collect the information from the sensors. A slip ring provides a method for making an electrical connection for a rotating assembly. Slip rings, also called rotary electrical interfaces, rotating electrical connectors, collectors, swivels or electrical rotary joints typically consist of a conductive circle or band mounted on the wind turbine shaft but insulated from the shaft. Fixed contacts or brushes run in contact with the ring, transferring electrical power or signals to the exterior, static part of the system. Slip rings are known in the art and their usage with wind turbines has been used to provide electrical connectivity.

Another embodiment of transferring the sensor information from the rotating assembly is by inductive coupling between two coils, one installed in the rotating assembly or frame and the other coil installed proximate to the first coil but not rotating. Typically a higher frequency and a modulation scheme is used to enable inductive signal transfer such as known in the art.

As noted, one exemplary application that benefits from the measurement system detailed herein relates to a drive train of a wind turbine. The wind turbines tend to have issues with bending moments on the shaft, caused by asymmetrical wind conditions on the large rotor, and the problem increases with larger rotor-blade systems. One embodiment of the wind turbine load control system includes using the main shaft as a primary sensor for asymmetrical loads. A further aspect involves magnetic encoding to enable measuring bending moments, shaft torque, and other parameters in an accurate and stable manner over time.

One exemplary embodiment relates to a reliable real-time measurement of the shaft torque and bending moments of wind turbine shafts and to the special load and control requirements of wind turbines. The system enables fast control action, thus reducing dynamic loading of the turbine for asymmetrical and symmetrical loads, including monitoring of bending moments and the reduction of such moments in applying asymmetrical load control (ALC), based on the bending moment measurement. The reaction times of existing turbines are relatively slow because conventional load sensing is based on measuring the electrical generator output power which is a reaction to the load. The present system provides real time sensing of the shaft and allows for a faster response than systems measuring generator output. Thus, the present system provides a more dynamic asymmetrical and symmetrical load control with real-time control of the pitch angles or other actuators.

Torque measurements with high bandwidth and repeatability also enable the system to detect vibrations or technical issues in the rotor shaft system at an early stage, for an advanced maintenance planning or for fatigue diagnostics such as early detection of gearbox failure.

Real-time monitoring of the torque under all operating conditions also enables higher energy output of the wind turbine. In one aspect, the system enables detection of dynamic load changes more quickly than with load measurements based on measuring the electrical generator power. Direct torque sensing enables a real-time dynamic control of the wind turbine pitch angle or similar actuators, thus minimizing dynamic loads. The wind turbine energy output can be increased if turbines are equipped with larger blades, producing more power if the wind is not blowing strongly. In case of strong and dynamic wind conditions, the enhanced dynamic (real-time) control would prevent the large turbine blades from damages.

In addition to accurate and reliable bending moment sensing, a reliable real-time torque measurement enables a more dynamic control which leads to more aggressive wind turbine designs with less dynamic loads therefore lower structural weight acceptable, larger rotors possible. Without such reliable sensing systems there is a risk that the complex feedback system fails and, accordingly, the wind power plant cannot be operated or only with a reduced power characteristic.

The magnetic encoding can also be used on other locations of the main shaft and wind turbine components, such as the pitch and yaw system, in order to enable measurements with high accuracy and stability over time, used for wind turbine control systems. The asymmetric load system detailed in certain embodiments incorporates sensors in nacelle-fixed coordinates and provides sensor longevity, reliability, and relatively simple, nacelle-fixed wiring. In some configurations, each sensor is mounted on a sensor bracket that is attached to the main bearing. Sensor readings from the sensors provide measured displacements or moments used by the control system to determine a pitch command for each rotor blade to reduce asymmetric rotor loading and a favorable yaw orientation to reduce pitch activity.

Torque sensing systems based on permanent magnetic encoded steel sections enable measurement of the shaft power output and bending at different shaft sections with high long-term stability. This is of high relevance for wind turbines, but also for steam turbines, gas turbines or large compressors where small decreases in the power output between individual turbine stages can easily be detected, enabling to perform preventive maintenance and keep the energy efficiency high at all times during the lifetime of a turbine or compressor.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A magneto strictive measurement system, comprising:
a plurality of encoded regions circumferentially disposed about an interior surface of a hollow shaft; and
one or more rotating sensors coupled to said shaft proximate at least some of the encoded regions, wherein said rotating sensors rotate with said shaft and enable measurements of magnetic field properties of the encoded regions.

2. The system according to claim 1, wherein said rotating sensors are affixed to the interior surface of the shaft or held in a fixture that is affixed to the interior surface of the shaft.

3. The system according to claim 1, wherein said encoded regions comprise first encoded regions and second encoded regions with one or more first encoded region sensors configured to measure shaft properties at the first encoded regions, and one or more second encoded region sensors configured to measure shaft properties at the second encoded regions.

4. The system according to claim 1, further comprising one or more stationary sensors disposed proximate the encoded regions with a gap between the stationary sensors and the shaft such that said stationary sensors do not rotate with said shaft.

5. The system according to claim 4, wherein said stationary sensors measure at least one of shaft speed, shaft position or torque.

6. The system according to claim 1, wherein the magnetic field properties include bending moments in a horizontal and vertical direction.

7. The system according to claim 1, further comprising a processing section for processing said magnetic field properties and computing shaft properties.

8. The system according to claim 7, wherein said processing section utilizes differential measurements for computing said shaft properties.

9. The system according to claim 7, further comprising one or more slip rings disposed about said shaft, wherein said slip rings communicate said magnetic field properties to said processing section.

10. The system according to claim 1, wherein said rotating sensors are at least one of Hall Effect sensors, giant magnetoresistive (GMR) sensors, fluxgate sensors, or magnetoimpedance sensors.

11. A magnetostrictive shaft, comprising:
one or more polarized encoded magnetic regions on an interior surface of a hollow shaft along a circumferential direction of said hollow shaft; and
one or more sensors disposed about said encoded magnetic regions, wherein at least one of said sensors measure magnetic field properties of said hollow shaft.

12. The shaft according to claim 11, wherein there is void space between said encoded magnetic regions.

13. The shaft according to claim 11, wherein said sensors are at least one of a non-contact sensor and a rotating sensor.

14. The shaft according to claim 11, wherein said encoded magnetic regions are separate segments and affixed to said interior surface of said shaft.

15. The shaft according to claim 11, wherein at least one of the encoded magnetic regions have two or more layers of encodings.

16. The shaft according to claim 11, wherein said magnetic field properties are at least one of torque and bending moments.

17. The shaft according to claim 11, wherein at least one of the sensors are coupled to an exterior surface of said hollow shaft.

18. The shaft according to claim 11, wherein measurements from said sensors are communicated to a processing unit.

19. The shaft according to claim 11, wherein said encoded polarized magnetic regions comprise first encoded regions and second encoded regions, wherein said first encoded regions are different than said second encoded regions.

* * * * *